April 28, 1953     I. C. BOWMAN     2,636,286
DEVICE FOR COLOR COMPARISONS
Filed March 29, 1949
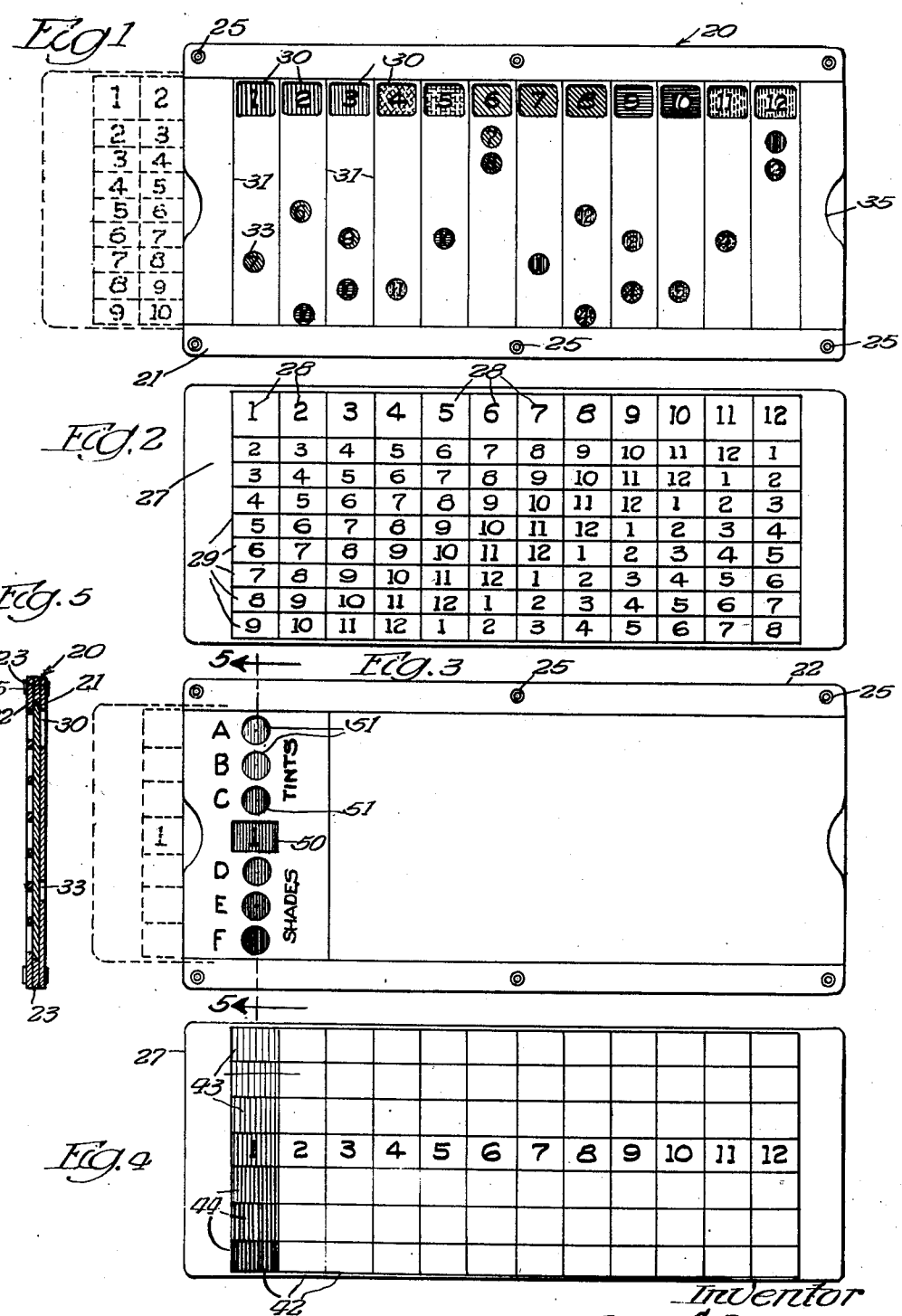

Patented Apr. 28, 1953

2,636,286

UNITED STATES PATENT OFFICE 2,636,286

DEVICE FOR COLOR COMPARISONS

Irwin C. Bowman, Chicago, Ill.

Application March 29, 1949, Serial No. 84,119

1 Claim. (Cl. 35—28.3)

The invention relates to devices for determining color combinations.

One object of the invention is to provide a simple and efficient device for determining a wide range of harmonious color combinations.

Another object of the invention is to provide a simple device which comprises a slidably connected color chart and mask, the color chart being provided with a horizontal row of areas provided with the major colors and auxiliary horizontal rows of color areas arranged in vertical alignment with the areas of major colors and with the colors of the auxiliary areas in each column differing from the major colors at the top of the columns, the mask being provided with means for displaying all of the major colors and predetermined auxiliary colors for comparison, the relative sliding of the chart and mask making it possible to display a wide range of permutations of the colors.

Another object of the invention is to provide the back of the chart for determining harmonious colors, means for displaying for selection the shades and tints of each major color.

Other objects of the invention will appear from the detailed description.

The invention consists in the several novel features hereinafter set forth and more particularly defined by claim at the conclusion hereof.

In the drawings—

Fig. 1 is a front elevation of a device embodying the invention, the mask and color chart being shown in normal position;

Fig. 2 is a front elevation of the slidable color chart;

Fig. 3 is a rear view of the device;

Fig. 4 is a rear view of the slidable chart;

Fig. 5 is a section taken on line 5—5 of Fig. 3.

The invention is exemplified in a device which comprises a holder generally designated 20 which includes a front card or sheet 21, a read back card or sheet 22, the upper and lower margins of which are spaced apart by strips 23 to form an open-ended slideway for a color chart generally designated 27. The cards 21, 22 and the strips 23 are secured together by rivets 25. The upper and lower edges of color chart 27 are confined for horizontal sliding movement between cards 21 and 22 by strips 23 to the right or left of the holder.

The color chart 27 is provided at its top with a horizontal row of major areas 28 bearing a series of colors for determining harmony in colors, such colors being identified by numerals as follows: red, 1; red-orange, 2; orange, 3; orange-yellow, 4; yellow, 5; yellow-green, 6; green, 7; blue-green, 8; blue, 9; blue-purple, 10; purple, 11; red-purple, 12.

The color chart 27 is provided below the color areas 28 with a series of horizontal rows of color areas 29 which are also arranged in columnar relation with the major color areas 28. Each horizontal row of auxiliary areas 29 bears a series of colors corresponding to the colors in the major areas 27 in the upper horizontal row but the colors in the auxiliary rows are staggered relatively to the same colors in the areas 29 so that when the chart is masked, as hereinafter described, the colors in columnar relation will be different and be displayed in the areas 28 and predetermined areas 29 of each column for comparison of the colors. As indicated by like numerals designating the same colors in Fig. 2, each column has a series of colors in the areas 29 different from the color in the major area 28 in the same column, and each auxiliary row of areas 29 has a series of the same colors in the row of and in horizontally offset relation to the same colors in the major areas 29.

The front card 21 of the holder functions as a mask for displaying different color combinations in the columnarly related colors in the major areas 28 and the auxiliary areas 29. The front card 21 of the holder is provided with a horizontal row of openings 30 for displaying the major color areas 28 on the chart and column-indicating lines 31 between said openings. Normally when the color chart is in the holder, as illustrated in full lines in Fig. 1, all of the major color areas 28 will be visible through and register with the openings 30, respectively. Additionally the front card 21 is provided in each column defined by lines 31 with one or more openings 33 for rendering visible predetermined colors in the auxiliary areas 29 for vertically matching the areas and the colors in the major row 28. Each opening 33 is adapted to successively register with all the auxiliary color areas 29 of one horizontal row on the chart when the chart is slidably shifted in the holder. The openings 33 are predeterminately spotted different distances from opening 30, respectively, so that different predetermined auxiliary color areas 29 in each row will be displayed in columnar relation with the colors in the major color areas 28, respectively. The windows or openings 30 and the windows or openings 33 in the mask exemplify means for displaying different colors in the major areas 28 and different predetermined colors in the auxiliary rows 29 in columnar relation by selective shift of the chart to the different positions in the holder. Preferably the areas defined by the columns between lines 31 are printed in a contrasting color, such as black (not shown) for producing a contrast between the color areas on the chart and the front of the mask. Notches 35 are formed in the ends of the front card 21 and the back card 22 for exposing a portion of and gripping the color chart for longitudinal sliding movement in the holder.

When the color chart is normally positioned in the holder or mask, as shown by full lines in Fig. 1, all the colors of the series wil be simultaneously displayed by openings 30 and one or more different predetermined colors will be displayed in columnar relation therewith by the openings 33 for determining harmony in the color combinations columnarly displayed. For example, in the left-hand column of the mask when the color chart is in its normal position, the color red will be displayed in the major opening as designated by numeral 1, and green, indicated by numeral 7, will be displayed in columnar relation. Similarly each major area 29 on the chart will be displayed in columnar relation with one or more of the auxiliary color areas predetermined by the location of the openings 33 in the columns. Colors 2, 6 and 10 will be similarly displayed in the next column; colors 3, 8 and 10 in the next column; colors 4 and 11 in the next column; colors 5 and 10 in the next column; colors 6, 7 and 8 in the next column; colors 7 and 1 in the next column; colors 8, 12 and 4 in the next column; colors 9, 2 and 4 in the next column; colors 10 and 5 in the next column; colors 11 and 4 in the next column; and colors 12, 1 and 2 in the last column. There is thus simultaneously displayed the twelve colors in the major areas and one or more different colors in auxiliary areas in each of the columns, respectively, so that when the device is in its normal position a considerable range of color comparisons can be made. The chart 27 is slidable to the left or to the right in the holder to successively bring the columns including a major area 28 and its columnarly associated opening 33 to display different auxiliary areas in columnar relation with the major areas. If other color comparisons are desired, color chart 27 is shifted to the right or to the left to columnarly associate with the colors in the major areas different colors in the auxiliary areas. For example, if the color chart 27 is shifted to the left, as illustrated by dotted lines in Fig. 1, colors 4 and 10 will be displayed in the left-hand column; colors 5, 9 and 1 in the next column; colors 6, 11 and 1 in the next column; colors 7 and 2 in the next column; colors 8 and 1 in the next column; colors 9, 10 and 11 in the next column; colors 10 and 4 in the next column; colors 11, 3 and 7 in the next column, and colors 12, 5 and 7 in the next column. By shifting the chart to different positions in the holder to bring the major areas 28 in registration with different openings 30 an extremely wide range of permutations of colors will be columnarly displayed for selection of harmonious combinations.

The device shown in Figs. 1 to 5 is also adapted to be used for displaying and selecting tints and shades of each of the dominating or major colors used. For this purpose the back or reverse face of the card 23 has impressed thereon in columns 42 the tints 43 and shades 44 of each of the dominating colors which are indicated by the same number-indications used on the color chart, as indicated in Fig. 4, in which the tints and shades are illustrated in one column, it being understood that the remaining columns are each provided with the tints and shades of one of the major colors. The areas of the central horizontal row bear colors designated from 1 to 12 corresponding to the colors similarly designated on the front face of the chart. Above this central row each column bears the tints 43, and below the shades 44 of the respective major colors in the central row. For example, when the chart is in its normal position in the holder, the color 1 will be displayed through the rectangular opening 50 in the back face of the holder, and the circular openings 51 above and below the opening 50 will display the respective tints and shades of the red color (1). From this display the user visualizes the tints and shades for selection. By sliding the chart to the left, each of the major colors and the tints and shades thereof will be successively and comparatively displayed through the openings 50 and 51. This exemplifies a simple device for selecting tints or shades for combining with selected colors for achieving color harmony, which is combined with the color chart on the front face of card 23.

The invention is not to be understood as limited to the details described, since these may be modified within the scope of the appended claim without departing from the spirit and scope of the invention.

Having thus described my invention what I claim as new and desire to secure by Letters Patent is:

A device for determining color combinations comprising: a holder including a back and a front, a chart slidably mounted between the back and the front, provided with a row of major areas provided with a series of different colors, and auxiliary rows of transversely and horizontally aligned areas arranged in columns below each of the major areas having the series of colors arranged differentially with respect to major areas in the same column, the front providing a mask provided with means for simultaneously displaying the major areas and with means for displaying in columnar and vertical alignment with the major areas predetermined individual colors in the auxiliary rows, the sliding movement of the chart in the holder for relative sliding crosswise of the columns being adapted to selectively display different columnar permutations of the colors in said major and auxiliary areas, the back face of the chart being provided with columns of areas with major colors and tints and shades of the colors, respectively, and the back of the holder being provided with means for displaying the columns of areas on the back of the chart, respectively.

IRWIN C. BOWMAN.

References Cited in the file of this patent
UNITED STATES PATENTS

| Number | Name | Date |
|---|---|---|
| Re. 13,358 | Wagner | Jan. 9, 1912 |
| 924,322 | Crosby | June 8, 1909 |
| 1,515,512 | Mitchell | Nov. 11, 1924 |
| 1,630,247 | Adler | May 31, 1927 |
| 1,666,337 | McDade | Apr. 17, 1928 |
| 1,958,192 | Fletcher et al. | May 8, 1934 |
| 2,512,181 | Spears | June 20, 1950 |